United States Patent
Ouchi et al.

(10) Patent No.: US 9,781,621 B2
(45) Date of Patent: Oct. 3, 2017

(54) TERMINAL, BASE STATION, COMMUNICATION METHOD, AND INTEGRATED CIRCUIT

(71) Applicant: SHARP KABUSHIKI KAISHA, Osaka-shi, Osaka (JP)

(72) Inventors: Wataru Ouchi, Osaka (JP); Tatsushi Aiba, Osaka (JP); Kimihiko Imamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/417,687

(22) PCT Filed: Jul. 31, 2013

(86) PCT No.: PCT/JP2013/070786
§ 371 (c)(1),
(2) Date: Jan. 27, 2015

(87) PCT Pub. No.: WO2014/021391
PCT Pub. Date: Feb. 6, 2014

(65) Prior Publication Data
US 2015/0195732 A1 Jul. 9, 2015

(30) Foreign Application Priority Data
Aug. 2, 2012 (JP) ................ 2012-171552

(51) Int. Cl.
*H04W 4/00* (2009.01)
*H04W 24/10* (2009.01)
*H04W 48/16* (2009.01)
*H04W 56/00* (2009.01)
*H04W 88/02* (2009.01)

(52) U.S. Cl.
CPC ........... *H04W 24/10* (2013.01); *H04W 48/16* (2013.01); *H04W 56/00* (2013.01); *H04W 88/02* (2013.01)

(58) Field of Classification Search
USPC ................ 370/252, 393, 329, 330, 331, 338
See application file for complete search history.

(56) References Cited

U.S. PATENT DOCUMENTS

2011/0235602 A1* 9/2011 Ji ......................... H04L 5/0007
370/329
2012/0120910 A1 5/2012 Mazzarese et al.
(Continued)

FOREIGN PATENT DOCUMENTS

| JP | 2012-034399 A | 2/2012 |
| WO | WO 2012/115366 A1 | 8/2012 |
| WO | WO 2013/176013 A1 | 11/2013 |

OTHER PUBLICATIONS

NTT DOCOMO, "Enhanced Cell Identification for Additional Carrier Type," 3GPP TSG RAN WG1 Meeting #68, R1-120398, Dresden, Germany, Feb. 6-10, 2012, pp. 1-4.
(Continued)

*Primary Examiner* — Zewdu A Beyen
(74) *Attorney, Agent, or Firm* — Birch, Stewart, Kolasch & Birch, LLP

(57) ABSTRACT

There are provided a terminal, a base station, a communication method, and an integrated circuit for enabling the base station and the terminal to efficiently perform received power measurement and perform a measurement report in a communication system in which the base station and the terminal perform communication with each other. The terminal that performs communication with the base station, includes a reception unit 205 that performs received power measurement that is based on a first signal in a certain cell, in which in a case where a configuration of a second signal is set and the certain cell is not set to a predetermined carrier type, the reception unit 205 performs the received power measurement that is based on the first signal, and in a case where the certain cell is set to the predetermined carrier type, the reception unit 205 performs the received power measurement that is based on the second signal.

3 Claims, 4 Drawing Sheets

(56) References Cited

U.S. PATENT DOCUMENTS

2012/0252432 A1* 10/2012 Henttonen ............ H04W 24/10
455/422.1
2015/0124731 A1   5/2015 Tsuboi et al.

OTHER PUBLICATIONS

3GPP TS 36.214 V10.1.0 (Mar. 2011); 3rd Generation Partnership Project; Technical Specification Group Radio Access Network; Evolved Universal Terrestrial Radio Access (E-UTRA); Physical layer; Measurements (Release 10), pp. 1-13.
New Postcom, "CSI-RS based RRM measurement for additional carrier type", 3GPP TSG RAN WG1 Meeting #69, R1-122096, Prague, Czech Republic, May 21-25, 2012, pp. 1-3.
NTT DOCOMO, "Issues Regarding Additional Carrier Type in Rel-11 CA", 3GPP TSG RAN WG1 Meeting #67, R1-114071, San Francisco, USA, Nov. 14-18, 2011, pp. 1-5.
CATT, "Discussion on additional carrier types," 3GPP TSG RAN WG1 Meeting #67, R1-113726, San Francisco, USA, Nov. 14-18, 2011, 2 pgs.
Ericsson et al., "Further details on design principle for a CRS-free additional carrier type," 3GPP TSG RAN WG1 Meeting #68bis, R1-121017, Jeju, Korea, Mar. 26-30, 2012, pp. 1-3.
NTT DOCOMO, "Views on DL RSs for Unsynchronized New Carrier," 3GPP TSG RAN WG1 Meeting #68bis, R1-121465, Jeju, Korea, Mar. 26-30, 2012, pp. 1-5.

* cited by examiner

TERMINAL, BASE STATION, COMMUNICATION METHOD, AND INTEGRATED CIRCUIT

TECHNICAL FIELD

The present invention relates to a terminal, a base station, a communication method, and an integrated circuit.

BACKGROUND ART

In communication systems approved by the Third Generation Partnership Project (3GPP), such as Wide Code Division Multiple Access (W-CDMA), Long Term Evolution (LTE), and LTE-Advanced (LTE-A), or in communication systems approved by the Institute of Electrical and Electronics Engineers (IEEE), such as Wireless LAN and Worldwide Interoperability for Microwave Access (Wi-MAX), a base station (a cell, a transmission station, a transmission apparatus, or an eNodeB) and a terminal (a mobile terminal, a reception station, a mobile station, a reception apparatus, user equipment (UE)) each include multiple transmit and receive antennas, space-multiplex a data signal, and realize high-speed data communication by using Multi Input Multi Output (MIMO) technology.

In the communication system, in order to realize the data communication between the base station and the terminal, the base station needs to perform various control processes on the terminal. For this reason, the base station notifies the terminal of control information using a predetermined resource, and thus performs the data communication in downlink and uplink. For example, the base station notifies the terminal of resource allocation information, modulation information on and coding information on the data signal, information on the number of space multiplexing of the data signal, transmission power control information and the like, and thus realizes the data communication. For these pieces of control information, a method disclosed in NPL 1 can be used.

The communication system corresponds to at least Time Division Duplex (TDD). LTE that employs a TDD scheme is also referred to as TD-LTE or LTE TDD. TDD is a technology that makes full duplex communication possible in a single frequency band by performing time division-multiplexing on an uplink signal and a downlink signal.

The communication system is a cellular communication system which is cellularly-divided for multiple areas covered by the base station. Furthermore, a single base station may manage multiple cells. Furthermore, a single base station may manage multiple remote radio heads (RRH). Furthermore, a single base station may manage multiple local areas. Furthermore, a single base station may manage multiple heterogeneous networks (HetNet).

In the communication system, the terminal can measure at least reference signal received power (RSRP) based on a cell-specific reference signal (CRS) (NPL 1).

In the communication system, communication may be performed using a carrier (component carrier) in which a part of physical channels or signals is not arranged. Here, such a carrier is referred to as a new carrier type (NCT). For example, a cell-specific reference signal, a physical downlink control channel, or a synchronization signal (a primary synchronization signal or a secondary synchronization signal) may not be arranged in the new carrier type. Furthermore, it has been considered that the Physical Discovery Channel (PDCH) for performing mobility measurement and time/frequency synchronization detection be introduced in a cell for which the new carrier type is set (NPL 2). Moreover, in some cases, the new carrier type is also referred to as an additional carrier type (ACT).

CITATION LIST

Non-Patent Literature

NPL 1: 3rd Generation Partnership Project Technical Specification Group Radio Access Network; Evolved Universal Terrestrial Radio Access (E-UTRA); Physical layer; Measurements (Release 10) 30 Mar. 2011, TS36.214 v10.1.0 (2011-03).

NPL 2: "Issues Regarding Additional Carrier Type in Rel-11 CA", R1-114071, 3GPP TSG-RAN WG1 Meeting #67, San Francisco, USA, 14-18 Nov. 2011.

DISCLOSURE OF THE INVENTION

Problems to be Solved by the Invention

However, the measurement of received power using a signal for time/frequency synchronization detection is not disclosed. Moreover, a measurement method for use in a terminal in a case where the received power measurement of a specific signal is not performed is not disclosed.

The present invention is made in view of the situation and an object of the present invention is to provide a terminal, a base station, a communication method, and an integrated circuit for enabling the base station and the terminal to efficiently perform received power measurement in a communication system in which the base station and the terminal perform communication with each other.

Means for Solving the Problems (1) To accomplish the object, the present invention provides the following means. That is, according to the present invention, there is provided a terminal that performs communication with a base station, including: a reception circuitry that performs received power measurement that is based on a first signal in a certain cell, in which in a case where a configuration of a second signal is set, if the certain cell is not set to a predetermined carrier type, the reception circuitry performs the received power measurement that is based on the first signal, and if the certain cell is set to the predetermined carrier type, the reception circuitry performs the received power measurement that is based on the second signal.

(2) Furthermore, in the terminal according to the present invention, in the case where the configuration of the second signal is set, if the certain cell is not set to the predetermined carrier type, the reception circuitry may perform the received power measurement that is based on the second signal.

(3) Furthermore, in the terminal according to the present invention, in the case where a configuration of a third signal is set, the reception circuitry may perform the received power measurement that is based on the third signal, regardless of a carrier type of the certain cell.

(4) Furthermore, in the terminal according to the present invention, in a case where the cell that is set to the predetermined carrier type is deactivated, the reception circuitry may perform the received power measurement that is based on the second signal, based on a first measurement period, and in which in a case where the cell that is set to the predetermined carrier type is activated, the reception circuitry may perform the received power measurement that is based on the second signal, based on a second measurement period.

(5) Furthermore, in the terminal according to the present invention, when a predetermined measurement time that is configured from the first measurement period elapses, the reception circuitry may report to a higher layer a result of the measurement of the received power that is based on the second signal.

(6) Furthermore, in the terminal according to the present invention, in a case where the received power that is based on the second signal is measured based on the second measurement period, when a predetermined measurement report event is fulfilled, the reception circuitry may report to a higher layer the result of the measurement of the received power for the second signal.

(7) Furthermore, according to the present invention, there is provided a base station that performs communication with a terminal, including: a transmission circuitry that transmits to the terminal information relating to a configuration of a second signal and information relating to a predetermined carrier type.

(8) Furthermore, in the base station according to the present invention, the transmission circuitry may transmit to the terminal information relating to a measurement report event with respect to the second signal.

(9) Furthermore, in the base station according to the present invention, the transmission circuitry may transmit to the terminal information relating to a first measurement period and information relating to a second measurement period with respect to a cell that is set to the predetermined carrier type.

(10) Furthermore, according to the present invention, there is provided a communication method for use in a terminal that performs communication with a base station, the method including: performing received power measurement that is based on a first signal in a certain cell; performing the received power measurement that is based on the first signal, if the certain cell is not set to a predetermined carrier type, in a case where a configuration of a second signal is set; and performing the received power measurement that is based on the second signal, if the certain cell is set to the predetermined carrier type.

(11) Furthermore, the communication method according to the present invention may further perform, by a higher layer, the received power measurement that is based on the second signal, if the certain cell is set to a predetermined carrier type, in the case where a configuration of the second signal is set.

(12) Furthermore, according to the present invention, there is provided a communication method for use in a base station that performs communication with a terminal, the method including: transmitting to the terminal information relating to a configuration of a second signal and information relating to a predetermined carrier type.

(13) Furthermore, according to the present invention, there is provided an integrated circuit that is mounted in a terminal that performs communication with a base station, the circuit causing the terminal to perform: a function of performing received power measurement that is based on a first signal in a certain cell; a function of performing the received power measurement that is based on the first signal, if the certain cell is not set to a predetermined carrier type, in a case where a configuration of a second signal is set; and a function of performing the received power measurement that is based on the second signal if the certain cell is set to the predetermined carrier type.

(14) Furthermore, in the integrated circuit according to the present invention, in the case where the configuration of the second signal is set, if the certain cell is not set to the predetermined carrier type, the terminal may be caused to perform a function of performing the received power measurement that is based on the second signal.

(15) Furthermore, according to the present invention, there is provided an integrated circuit that is mounted in a base station that performs communication with a terminal, the circuit causing the base station to perform a function of transmitting to the terminal information relating to a configuration of a second signal and information relating to a predetermined carrier type.

When this is done, the received power measurement can be efficiently performed.

EFFECTS OF THE INVENTION

According to the present invention, the received power measurement can be efficiently performed in the communication system in which the base station and the terminal perform communication with each other.

Figure 1:
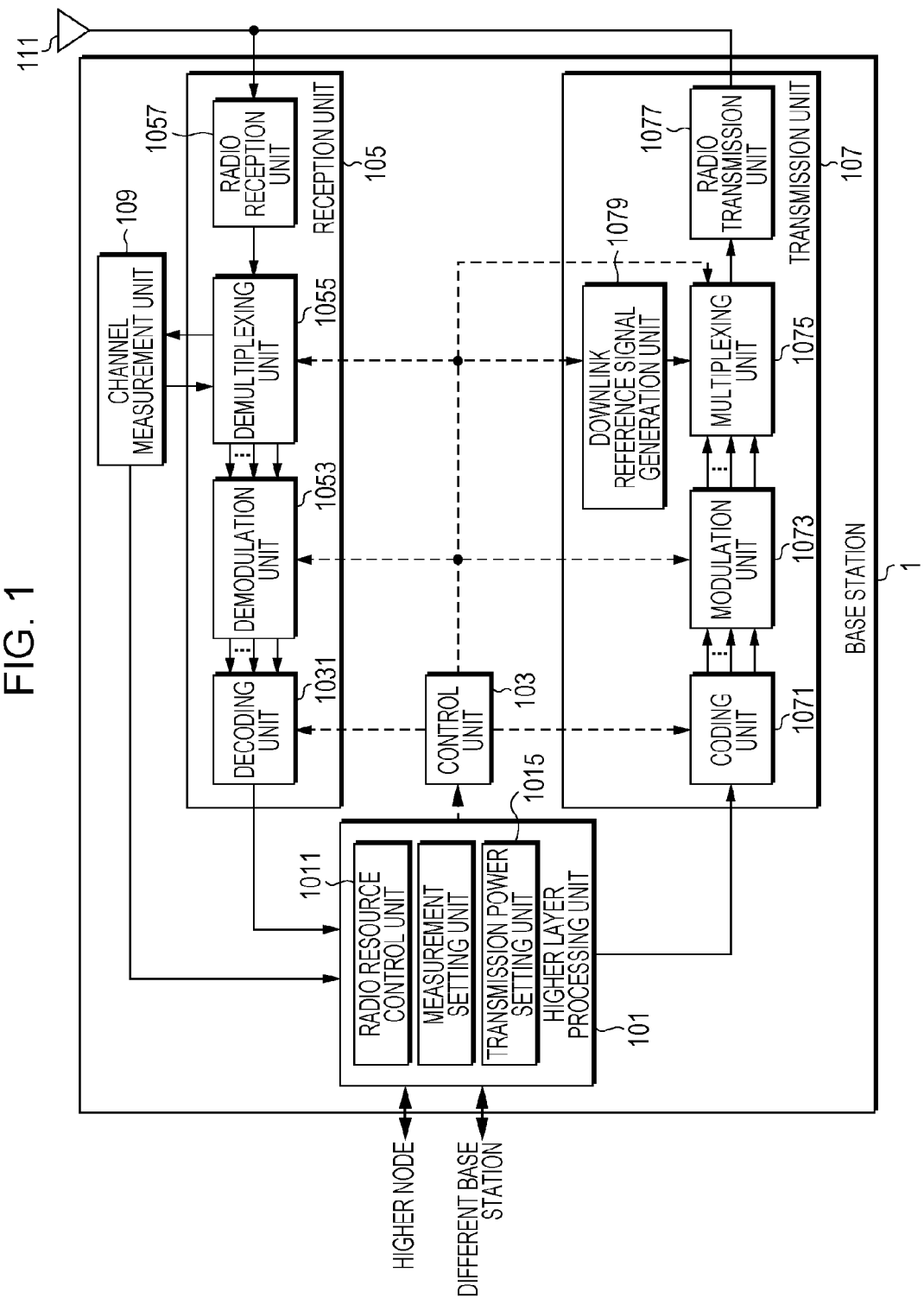
FIG. 1 is a schematic block diagram illustrating a configuration of a base station 1 according to a first embodiment of the present invention.

MODE FOR CARRYING OUT THE INVENTION (Physical Channel)

A physical channel (or a physical signal) in LTE and LTE-A is described. A channel means a medium that is used in signal transmission. A physical channel means a physical medium that is used in the signal transmission. There is a likelihood that in LTE and LTE-A, a physical channel will be added from now on or a structure or format type of the physical channel will be changed or added, but in such a case, the addition and change do not have an effect on a description of each embodiment of the present invention.

In LTE and LTE-A, physical channel scheduling is managed using a radio frame. One radio frame is 10 ms, and one radio frame consists of 10 subframes. Moreover, one subframe consists of 2 slots (that is, one slot is 0.5 ms). Furthermore, the scheduling for allocation of the physical channels is managed using a resource block as a minimum unit. The resource block is defined by a given frequency domain that consists of a set of multiple subcarriers (for example, 12 subcarriers) along a frequency axis and by a domain that consists of given transmission time intervals (one slot, or 7 symbols).

A synchronization signal consists of 3 types of primary synchronization signals (PSS) and a secondary synchronization signal (SSS) that is configured from 31 types of codes which are alternately arranged in the frequency domain, and frame timing for radio synchronization with 504 cell identities (PCI: Physical layer Cell Identify, Physical Cell Identity, or Physical Cell Identifier) by which to identify base stations is indicated by a combination of the primary synchronization signal and the secondary synchronization signal. A terminal 2 specifies a cell identity of the synchronization signal received through cell searching.

A Physical Broadcast Channel (PBCH) is transmitted for the purpose of notifying a control parameter (broadcast information or system information) that is commonly used in the terminals within a cell. For the broadcast information that is not notified on the PBCH, a radio resource is notified on the PDCCH, and a layer 3 message (system information) is transmitted on the PDSCH. A cell global identifier (CGI) indicating an identifier dedicated to a cell, a tracking area identifier (TAI) managing an area for waiting due to paging, random access configuration information (a transmission timing timer and the like), shared radio resource configuration information and the like are notified as the broadcast information.

A downlink reference signal is classified by its usage into multiple types. For example, a cell-specific reference signal (CRS) is a pilot signal that is transmitted with predetermined power for every cell, and is a downlink reference signal that is periodically repeated in a frequency domain and a time domain based on a predetermined rule. The terminal 2 measures reception quality for every cell by receiving the cell-specific reference signal. Furthermore, the terminal 2 uses a downlink cell-specific reference signal as a physical downlink control channel that is transmitted at the same that time the cell-specific reference signal is transmitted, or also as a reference signal for demodulation of a Physical Downlink Shared Channel. A sequence that is identifiable for every cell is used as a sequence that is used in the cell-specific reference signal. The sequence may be generated with a pseudo-random sequence. Furthermore, the sequence may be generated with a Zadoff-Chu sequence.

Furthermore, the downlink reference signal is used also in downlink channel fluctuation estimation. The downlink reference signal that is used in the channel fluctuation estimation may be also referred to as a channel state information reference signal (CSI-RS) or a CSI reference signal. Furthermore, the downlink reference signal that is dedicatedly set for every terminal is referred to as a UE specific reference signal (UERS) or a dedicated RS, or a downlink demodulation reference signal (DL DMRS); and is used in demodulation of the physical downlink control channel or the physical downlink shared channel.

The physical downlink shared channel (PDSCH) is used to transmit downlink data. Furthermore, the physical downlink shared channel is used to notify the terminal 2 of the broadcast information (system information) that is not notified through paging or on the physical broadcast channel. Radio resource allocation information of the physical downlink shared channel is indicated with the physical downlink control channel.

The physical downlink control channel (PDCCH) is transmitted with the first several OFDM symbols at each subframe, and is used for the purpose of indicating to the terminal 2 resource allocation information in accordance with the scheduling by the base station or an amount of adjustment for an increase or a decrease in transmission power. The terminal 2 monitors the physical downlink control channel that is destined for itself before transmitting and receiving the layer 3 message (paging, handover command, or the like) and receives the physical downlink control channel that is destined for itself. Thus, the terminal 2 needs to acquire from the physical downlink control channel the resource allocation information that is referred to as an uplink grant at the time of the transmission and as a downlink grant (also referred to as a downlink assignment) at the time of the reception. Moreover, in addition to being transmitted with the OFDM symbol(s) described above, it is possible that the physical downlink control channel may be configured to be transmitted with a domain of the resource block that is dedicatedly allocated from the base station 1 to the terminal 2. In some cases, the physical downlink control channel that is transmitted with the domain of the resource block which is dedicatedly allocated from the base station 1 to the terminal 2 is also called an enhanced physical downlink control channel (enhanced PDCCH (ePDCCH)). Furthermore, in some cases, the PDCCH that is transmitted with the OFDM symbol(s) described above is also referred to as a first control channel. Furthermore, in some cases, the ePDCCH is also referred to as a second control channel.

A physical uplink shared channel (PUSCH) mainly uplink data and uplink control data, and it is possible that the physical uplink shared channel (PUSCH) also contains control data, such as down link reception quality, ACK/NACK, or the like. Furthermore, in addition to the uplink data, the physical uplink shared channel (PUSCH) is used also for notifying the base station 1 of uplink control information. Furthermore, as is the case with downlink, the resource allocation information of the physical uplink shared channel is indicated with the physical downlink control channel.

The physical uplink control channel (PUCCH) is used for sending an acknowledgement/negative acknowledgement (ACK/NACK) of data that is transmitted on the physical downlink shared channel, for notifying downlink channel information (downlink channel state information) and for making a scheduling request (SR) that is an uplink resource allocation request (radio resource request). The channel state information (CSI) includes a channel quality indicator (CQI), a precoding matrix indicator (PMI), a precoding type indicator (PTI), and a rank indicator (RI). In some cases, each indicator is expressed as an indication, the indicator and the indication have the same application and meaning.

Uplink reference signals include a demodulation reference signal (DMRS) and a sounding reference signal (SRS), the DMRS is used by the base station to demodulate the physical uplink control channel the PUCCH and/or the physical uplink shared channel the PUSCH, and the SRS is mainly used by the base station to estimate an uplink channel state. Furthermore, there are two types of sounding reference signal: a periodic sounding reference signal (Periodic SRS (P-SRS)) and an aperiodic sounding reference signal (Aperiodic SRS (A-SRS)). In some cases, the uplink reference signal is also referred to as an uplink pilot signal or an uplink pilot channel. Furthermore, in some cases, the periodic sounding reference signal is also referred to as a periodic sounding reference signal or a trigger type 0 sounding reference signal. Furthermore, in some cases, the aperiodic sounding reference signal is also referred to as an aperiodic sounding reference signal or a trigger type 1 sounding reference signal. Moreover, in coordinated communication, the aperiodic sounding reference signal can be divided into a signal specific to uplink channel estimation and a signal that is used for correcting a downlink channel state (a CQI, a PMI, or a RI).

A physical random access channel (PRACH) is a channel that is used for notifying a preamble sequence and has a guard time. The preamble sequence may be configured to prepare 64 types of sequences to express 6-bit information. The physical random access channel is used as means by which the terminal has access to the base station 1. The terminal 2 uses the physical random access channel in order to make a request to the base station 1 for the radio resource when the physical uplink control channel is not set or to make a request to the base station 1 for transmission timing adjustment information (also referred to as timing advance (TA)) indispensable in matching uplink transmission timing to a base-station reception timing window.

Specifically, the terminal 2 transmits the preamble sequence using the radio resource for the physical random access channel that is set by the base station. The terminal 2 that receives the transmission timing adjustment information sets the transmission timing timer that counts the effective time of the transmission timing adjustment information that is set to be shared by the broadcast information (or is dedicatedly set with the layer 3 message), and manages an uplink state as a transmission timing adjustment state during the effective time of the transmission timing timer (while the counting is in progress) and as a transmission timing non-adjustment state (a state where the transmission timing is not adjusted) during the non-effective time (after the transmission timing timer expires). The layer 3 message is a control plane message that is exchanged with a RRC (radio resource control) layer between the terminal 2 and the base station 1, and is used as a message that has the same meaning as RRC signaling or an RRC message. Moreover, detailed descriptions of other physical channels are omitted because they have no relationship with each embodiment of the present invention. Furthermore, in some cases, the RRC signaling is also referred to as higher layer signaling or dedicated signaling. Moreover, in some cases, the RRC signaling is also referred to as the RRC message.

(First Embodiment)

A first embodiment of the present invention will be described below. A communication system according to the first embodiment includes a primary base station (also referred to as a macro base station, a first base station, a first communication apparatus, a serving base station, an anchor base station, a master base station, a macro cell, a first cell, or a primary cell) as the base station 1 (hereinafter also referred to as a base station apparatus, a transmission apparatus, a cell, a serving cell, a transmission station, a transmission point, a transmission antenna group, a transmission antenna port group, or an eNodeB). Moreover, the communication system according to the first embodiment may include a secondary base station (also referred to as a remote radio head (RRH), a remote antenna, a forward-extending antenna, a distributed antenna, a reference point, a low power node (LPN), a micro base station, a pico base station, a femto base station, a small base station, a local area base station, a phantom base station, a home eNodeB, a second base station apparatus, a second communication apparatus, a coordinated base station group, a coordinated base station set, a coordinated base station, a micro cell, a pico cell, a femto cell, a small cell, a phantom cell, a local area, a second cell, and a secondary cell). Furthermore, the communication system according to the first embodiment includes the terminal 2 (hereinafter also referred to as a mobile station, a mobile station apparatus, a terminal apparatus, a mobile terminal, a receiving apparatus, a reception point, a receiving terminal, a third communication apparatus, a receive antenna group, a receive antenna port group, or user equipment (UE)). Here, the secondary base station 1 may be indicated as multiple secondary base stations. For example, the primary base station and the secondary base station may perform communication with the terminal 2 using a heterogeneous network arrangement, with some or all portions of a coverage of the secondary base station being included in a coverage of the primary base station.

In some cases, in downlink transmission, the base station 1 is also referred to as a transmission point (TP). Furthermore, in some cases, in uplink transmission, the base station 1 is also referred to as a reception point (RP). Furthermore, a downlink transmission point and an uplink reception point are path loss reference points (reference points) for measurement of downlink path loss. Furthermore, the reference point for the measurement of the downlink path loss may be set independently of the transmission point or the reception point.

Furthermore, the small cell, the phantom cell, or the local area cell may be set as a third cell. Furthermore, the small cell, the phantom cell, or the local area cell may be re-set as a primary cell. Furthermore, the small cell, the phantom cell, or the local area cell may be re-set as a secondary cell. The small cell, the phantom cell, or the local area cell may be re-set as a serving cell.

FIG. 1 is a schematic block diagram illustrating a configuration of the base station 1 according to the present invention. As illustrated, the base station 1 may be configured to include a higher layer processing unit 101, a control unit 103, a reception unit 105, a transmission unit 107, a channel measurement unit 109, and a transmit and receive antenna 111. Furthermore, the higher layer processing unit 101 may be configured to include a radio resource control unit 1011, a measurement setting unit 1013, and a transmission power setting unit 1015. Furthermore, the reception unit 105 may be configured to include a decoding unit 1051, a demodulation unit 1053, a demultiplexing unit 1055 and a radio reception unit 1057. Furthermore, the transmission unit 107 may be configured to include a coding unit 1071, a modulation unit 1073, a multiplexing unit 1075, a radio transmission unit 1077 and the downlink reference signal generation unit 1079.

The higher layer processing unit 101 performs processing of a medium access control (MAC) layer, a packet data convergence protocol (PDCP) layer, a radio link control (RLC) layer, and a radio resource control (RRC) layer.

The radio resource control unit 1011 that is included in the higher layer processing unit 101 generates information that is arranged in each channel for downlink, or acquires such information from a higher node, and outputs the generated or acquired information to the transmission unit 107. Furthermore, the radio resource control unit 1011 allocates the radio resource in which the terminal 2 arranges the physical uplink shared channel (PUSCH) that is uplink data information, out of an uplink radio resource. Furthermore, the radio resource control unit 1011 determines the radio resource in which the physical downlink shared channel (PDSCH) that is downlink data information is arranged, from downlink radio resources. The radio resource control unit 1011 generates downlink control information indicating the allocation of the radio resource and transmits the generated downlink control information to the terminal 2 through the transmission unit 107. When the radio resource in which the PUSCH is arranged is allocated, the radio resource control unit 1011 preferentially allocates the radio resource that has good channel quality, based on a result of uplink channel measurement that is input from the channel measurement unit 109. To be more precise, the radio resource control unit 1011 assigns pieces of information relating to configurations of various downlink signals and pieces of information relating to configurations of various uplink signals to a certain terminal or to a certain cell. Furthermore, the radio resource control unit 1011 assigns information relating to a configuration of a first signal and information relating to a configuration of a second signal to a certain terminal or to a certain cell. The pieces of information relating to these types of configurations are generated and are output to the transmission unit 107. Here, information relating to an n-th signal (n is a natural number) may be set.

The measurement setting unit 1013 that is included in the higher layer processing unit 101 generates information relating to a measurement configuration, information relating to a measurement object configuration, information relating to a reporting configuration, information relating to a measurement reporting configuration, information relating to a CQI reporting configuration, and outputs these pieces of information to the transmission unit 107.

The higher layer processing unit 101 generates control information in order to perform control of the reception unit 105 and of the transmission unit 107, based on the uplink control information (UCI) that is notified on the physical uplink control channel (PUCCH) from the terminal 2, and a buffer situation notified from the terminal 2 or various pieces of configuration information on each of the terminals 2, which are set by the radio resource control unit 1011, and outputs the generated control information to the control unit 103. Moreover, included in UCI is at least one among an Ack/Nack, a channel quality indicator (CQI), and a scheduling request (SR).

The transmission power setting unit 1015 sets the transmission power of each of the PRACH, the PUCCH, the PUSCH, the P-SRS, and the A-SRS. Specifically, the transmission power setting unit 1015 sets the transmission power of the terminal 2 in such a manner that the PUSCH and the like satisfy predetermined channel quality, considering interference with the adjacent base station 1, according to information indicating an amount of interference from an adjacent base station 1, information indicating an amount of interference that is notified from the adjacent base station 1 and that is given to the adjacent base station 1, channel quality being input from the channel measurement unit 109, or the like, and transmits information indicating the configuration to the terminal 2, through the transmission unit 107.

Specifically, the transmission power setting unit 1015 sets $P_{O\_PUSCH}$, $\alpha$, $P_{SRS\_OFFSET}(0)$ (first SRS power offset parameter (pSRS-Offset)) that is a power offset for the P-SRS, and $P_{SRS\_OFFSET}(1)$ (second SRS power offset parameter (pSRS-OffsetAp)) that is a power offset for the A-SRS, generates a signal including information indicating the configuration, as a radio resource control signal, and notifies each of the terminals 2 of the generated signal through the transmission unit 107 on the PDSCH. Furthermore, the transmission power setting unit 1015 sets a TPC command, generates information indicating the TPC command, and notifies each of the terminals 2 of the generated information on the PDCCH through the transmission unit 107. Moreover, $\alpha$ mentioned here is a coefficient that, together with a path loss value, is used to set the transmission power, and by which to indicate the extent to which a path loss is compensated for, in other words, a coefficient (an attenuation coefficient or a path loss compensation coefficient) by which to determine to what extent the transmission power is increased or decreased according to the path loss (to be more precise, by which to determine to what extent the transmission power is adjusted). Normally, $\alpha$ is a value from 0 to 1. If $\alpha$ is 0, the adjustment of the power in accordance with the pass loss is not made. If $\alpha$ is 1, the transmission power for the terminal 2 is increased or decreased in such a manner that the path loss does not have an effect on the base station 1. Furthermore, a TPC command for the SRS is set by taking into consideration a state of the terminal 2, information indicating the TPC command is generated, and the generated information is notified to each of the terminals 2 through the transmission unit 107 on the PDCCH. Furthermore, a DCI format including the TPC command is generated and is notified to each of the terminals 2 through the transmission unit 107 on the PDCCH.

The control unit 103 generates a control signal for performing the control of the reception unit 105 and of the transmission unit 107, based on the control information from the higher layer processing unit 101. The control unit 103 outputs the generated control signal to the reception unit 105 and the transmission unit 107, and thus performs the control of the reception unit 105 and of the transmission unit 107.

The reception unit 105 outputs to the higher layer processing unit 101 information that is obtained by demultiplexing, demodulating, and decoding a signal received from the terminal 2 through the transmit and receive antenna 111 according to the control signal being input from the control unit 103. The radio reception unit 1057 converts (downconverts) an uplink signal received through the transmit and receive antenna 111 into an intermediate frequency (IF), removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to the guard interval (GI) from the digital signal that results from the conversion. The radio reception unit 1057 performs Fast Fourier Transform (FFT) on the signal from which the guard interval is removed, and outputs the resulting signal to the demultiplexing unit 1055 that extracts the signal in the frequency domain.

The demultiplexing unit 1055 demultiplexes the signal being input from the radio reception unit 1057 into signals such as the PUCCH, the PUSCH, the UL DMRS, and the SRS. Moreover, the demultiplexing is performed based on allocation information on the radio resource, which is determined in advance by the base station 1 and is notified to each terminal 2. Furthermore, the demultiplexing unit 1055 makes an adjustment of channels, the PUCCH and the PUSCH, from a channel estimate being input from the channel measurement unit 109. Furthermore, the demultiplexing unit 1055 outputs the UL DMRS and the SRS, which result from the demultiplexing, to the channel measurement unit 109.

The demodulation unit 1053 performs Inverse Discrete Fourier Transform (IDFT) on the PUSCH, acquires a modulation symbol, and performs modulation of the received signal on each of the modulation symbols in the PUCCH and the PUSCH, using a modulation scheme that is prescribed in advance, such as Binary Phase Shift Keying (BPSK), Quadrature Phase Shift Keying (QPSK), 16 Quadrature Amplitude Modulation (16 QAM), or 64 quadrature amplitude modulation (64 QAM), or that is notified by the base station 1 to each of the terminals 2 with the downlink control information.

The decoding unit 1051 performs decoding on the demodulated coded bits in the PUCCH and the PUSCH at the coding rate in compliance with a coding scheme that is prescribed in advance, or is notified in advance by the base station 1 to the terminal 2 with the uplink grant (UL grant), and outputs the decoded data information and the uplink control information to the higher layer processing unit 101.

The channel measurement unit 109 measures the channel estimate, the channel quality, and the like from the UL DMRS being referred to as the uplink demodulation reference signal and the SRS, which are input from the demultiplexing unit 1055, and outputs a result of the measurement to the demultiplexing unit 1055 and the higher layer processing unit 101. Furthermore, the channel measurement unit 109 measures received power and/or reception quality of first to n-th signals, and outputs a result of the measurement to the demultiplexing unit 1055 and the higher layer processing unit 101.

The transmission unit 107 generates the reference signal for downlink (downlink reference signal) in accordance with the control signal being input from the control unit 103, codes and modulates the data information being input from the higher layer processing unit 101 and the downlink control information, and multiplexes the PDCCH, the PDSCH, and the downlink reference signal, and transmits a signal to the terminal 2 through the transmit and receive antenna 111.

The coding unit 1071 performs the coding, such as the turbo coding, the convolutional coding, and the block coding, on the downlink control information being input from the higher layer processing unit 101 and the data information. The modulation unit 1073 performs modulation on the coded bits with the modulation schemes such as QPSK, 16 QAM, and 64 QAM. The downlink reference signal generation unit 1079 generates as the downlink reference signal a sequence that is obtained according to a rule that is prescribed in advance based on the cell ID for identifying the base station 1 and that is already known to the terminal 2 and the like. The multiplexing unit 1075 multiplexes each modulated channel and the generated downlink reference signal.

The radio transmission unit 1077 performs Inverse Fast Fourier Transform (IFFT) on the multiplexed modulation symbol, performs the modulation in compliance with an OFDM scheme, appends the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high-frequency signal, removes unnecessary frequency components, and performs power amplification, and outputs a final result to the transmit and receive antenna 111 for transmission.

Figure 2:
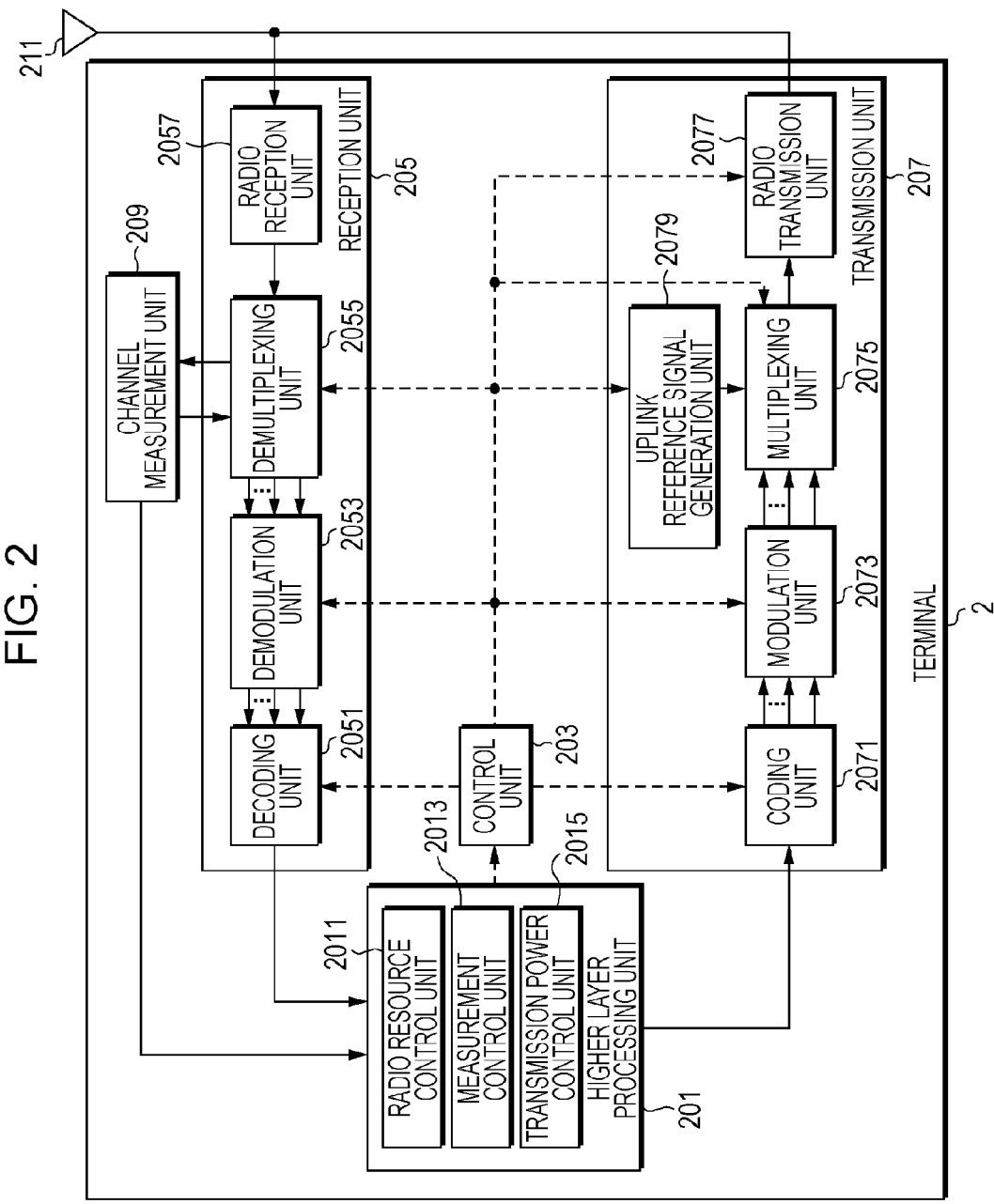
FIG. 2 is a schematic block diagram illustrating a configuration of a terminal 2 according to the first embodiment of the present invention.

FIG. 2 is a schematic block diagram illustrating a configuration of the terminal 2 according to the present embodiment. As illustrated, the terminal 2 may be configured to include a higher layer processing unit 201, a control unit 203, a reception unit 205, a transmission unit 207, a channel measurement unit 209, and a transmit and receive antenna 211. Furthermore, the higher layer processing unit 201 may be configured to include a radio resource control unit 2011, a measurement control unit 2013, and a transmission power control unit 2015. Furthermore, the reception unit 205 may be configured to include a decoding unit 2051, a demodulation unit 2053, a demultiplexing unit 2055, and a radio reception unit 2057. Furthermore, the transmission unit 207 may be configured to include a coding unit 2071, a modulation unit 2073, a multiplexing unit 2075, and a radio transmission unit 2077.

The higher layer processing unit 201 outputs to a transmission unit the uplink data information that is generated by a user operation and the like. Furthermore, the higher layer processing unit 201 performs processing of a medium access control layer, a packet data convergence protocol layer, a radio link control layer, and a radio resource control layer.

The radio resource control unit 2011 that is included in the higher layer processing unit 201 performs management of various pieces of configuration information on the terminal 2 itself. Furthermore, the radio resource control unit 2011 generates information that is arranged in each uplink channel and outputs the generated information to the transmission unit 207. The radio resource control unit 2011 generates the control information for performing the control of the reception unit 205 and of the transmission unit 207, based on various pieces of configuration information on the terminal 2 itself, which is set with the downlink control information that is notified from the base station 1 on the PDCCH and with radio resource control information that is notified on the PDSCH, and which is managed by the radio resource control unit 2011, and outputs the generated control information to the control unit 203. Furthermore, the radio resource control unit 2011 sets various parameters of each signal, based on pieces of information relating to configurations of first to n-th signals, which are notified from the base station 1. The pieces of information being set are generated and output the transmission unit 207 through the control unit 203.

The radio resource control unit 2011 that is included in the higher layer processing unit 201 acquires from the reception unit 205 information indicating a sounding subframe (an SRS subframe and an SRS transmission subframe) that is a subframe by which to reserve a radio resource for transmitting the SRS that is broadcast by the base station 1, and a bandwidth of the radio resource that is reserved to transmit the SRS within the sounding subframe, information indicating a subframe by which to transmit a periodic SRS that is notified by the base station 1 to the terminal 2 itself, a frequency band, and an amount of cyclic shift that is used in a CAZAC sequence for the periodic SRS, and information indicating the frequency band in which to transmit an aperiodic SRS that is notified by the base station 1 to the terminal 2 itself, and the amount of cyclic shift that is used in a CAZAC sequence for the aperiodic SRS.

The radio resource control unit 2011 performs control of SRS transmission in accordance with the information described above. Specifically, the radio resource control unit 2011 controls the transmission unit 207 in such a manner that the periodic SRS is transmitted one time or periodically in accordance with the information relating to the periodic SRS described above. Furthermore, in a case where an SRS request (SRS indicator) being input from the reception unit 205 makes a request for transmission of the aperiodic SRS, the radio resource control unit 2011 transmits the aperiodic SRS only the number of times (for example, one time) that is prescribed in advance, in accordance with information relating to the aperiodic SRS.

The transmission power control unit 2015 that is included in the higher layer processing unit 201 performs transmission power control based on configurations of the transmission power of each of the PUCCH, the PUSCH, the periodic SRS, and the aperiodic SRS, and thus outputs the control information to the control unit 203. Specifically, the transmission power control unit 2015 controls each of the transmission power for the periodic SRS and the transmission power for the aperiodic SRS, based on $P_{0\_PUSCH}$, $\alpha$, $P_{SRS\_OFFSET}(0)$ (first SRS power offset (pSRS-Offset)) that is a power offset for the periodic SRS, $P_{SRS\_OFFSET}(1)$ (second SRS power offset (pSRS-OffsetAp)) that is a power offset for the aperiodic SRS, and the TPC command, which are acquired from the reception unit 205. Moreover, the transmission power control unit 2015 causes $P_{SRS\_OFFSET}$ to switch between a first power offset and a second power offset according to whether the SRS is the periodic SRS or the aperiodic SRS.

The measurement control unit 2013 that is included in the higher layer processing unit 201 instructs the reception unit 205, the channel measurement unit 209, and the transmission unit 207 to perform received power measurement, received quality measurement, channel estimation, or the like, through the control unit 203, based on information relating to a measurement configuration, which is notified from the base station 1, information relating to the measurement object configuration, information relating to the reporting configuration, information relating to the measurement reporting configuration, and information relating to the CQI reporting configuration.

The control unit 203 generates a control signal for performing the control of the reception unit 205 and of the transmission unit 207, based on the control information from the higher layer processing unit 201. The control unit 203 outputs the generated control signal to the reception unit 205 and the transmission unit 207, and thus performs the control of the reception unit 205 and of the transmission unit 207.

In accordance with the control signal being input from the control unit 203, the reception unit 205 demultiplexes, demodulates, and decodes a received signal that is received from the base station 1 through the transmit and receive antenna 211, and outputs the resulting information to the higher layer processing unit 201.

The radio reception unit 2057 converts (down-converts) an uplink signal received through each received antenna into an intermediate frequency, removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 2057 removes a portion equivalent to the guard interval from the digital signal that results from the conversion, performs Fast Fourier Transform on the signal from which the guard interval is removed, and extracts a signal in the frequency domain.

The demultiplexing unit 2055 demultiplexes the extracted signal into the physical downlink control channel (PDCCH), the PDSCH, and the downlink reference signal (DRS). Moreover, the demultiplexing is performed based on the allocation information on the radio resource and the like that are notified with the downlink control information.

Furthermore, the demultiplexing unit 2055 makes an adjustment of channels, the PDCCH and the PDSCH, from a channel estimate being input from the channel measurement unit 209. Furthermore, the demultiplexing unit 2055 outputs the downlink reference signal, which results from the demultiplexing to the channel measurement unit 209.

The demodulation unit 2053 performs demodulation for the PDCCH in compliance with the QPSK modulation scheme and outputs a result of the demodulation to the decoding unit 2051. The decoding unit 2051 attempts the decoding of the PDCCH and, in a case where the decoding succeeds, outputs the decoded downlink control information to the higher layer processing unit 201.

The demodulation unit 2053 performs the demodulation, which is in compliance with the modulation scheme that is notified with the downlink control information, such as QPSK, 16 QAM, and 64 QAM, for the PDSCH, and outputs a result of the demodulation to the decoding unit 2051. The decoding unit 2051 performs the decoding on the coding rate that is notified with the downlink control information, and outputs the decoded data information to the higher layer processing unit 201.

The channel measurement unit 209 measures a downlink path loss from the downlink reference signal being input from the demultiplexing unit 2055, and outputs the measured path loss to the higher layer processing unit 201.

Furthermore, the channel measurement unit 209 calculates a downlink channel estimate from the downlink reference signal and outputs the calculated downlink channel estimate to the demultiplexing unit 2055.

Furthermore, the channel measurement unit 209 performs the received power measurement or the received quality measurement of the first signal and/or the second signal in accordance with various pieces of information relating to the measurement configuration, which is notified from the measurement control unit 2013 through the control unit 203. A result of the measurement is output to the higher layer processing unit 201.

Furthermore, in a case where the channel measurement unit 209 is instructed to perform the channel estimation of the first signal and/or the second signal, it may output a result of the channel estimation of each signal to the higher layer processing unit 201.

In accordance with the control signal being input from the control unit 203, the transmission unit 207 generates the UL DMRS and/or the SRS, codes and modulates the data information being input from the higher layer processing unit 201, multiplexes the PUCCH, the PUSCH, the UL DMRS and/or the SRS that are generated, adjusts the transmission power of the PUCCH, the PUSCH, the UL DMRS and the SRS, and transmits a result of the multiplexing to the base station 1 through the transmit and receive antenna 211 with the adjusted transmission power.

Furthermore, in a case where information relating to a result of the measurement is output from the higher layer processing unit 201, the transmission unit 207 transmits to the base station 1 the information being output through the transmit and receive antenna 211.

Furthermore, in a case where channel state information that is the result of the channel estimation is output from the higher layer processing unit 201, the transmission unit 207 feeds the channel state information back to the base station 1. To be more precise, the higher layer processing unit 201 generates the channel state information (CSI) based on the result of the measurement, which is notified from the channel measurement unit, and feeds the generated channel state information back to the base station 1 through the control unit 203.

The coding unit 2071 performs the coding, such as the turbo coding, the convolutional coding, and the block coding, on the uplink control information being input from the higher layer processing unit 201 and the data information. The modulation unit 2073 modulates the coded bits being input from the coding unit 2071 with the modulation scheme such as BPSK, QPSK, 16 QAM, or 64 QAM.

An uplink reference signal generation unit 2079 generates the CAZAC sequence that is obtained according to the rule which is prescribed in advance based on the cell ID for identifying the base station 1, the bandwidth in which the UL DMRS and the SRS are arranged, and the like, and that is already known to the base station 1. Furthermore, in accordance with the control signal being input from the control unit 203, the uplink reference signal generation unit 2079 gives the cyclic shift to the CAZAC sequences for the generated UL DMRS and SRS.

In accordance with the control signal being input from the control unit 203, the multiplexing unit 2075 rearranges PUSCH modulation symbols in parallel and then performs Discrete Fourier Transform (DFT) on the arranged PUSCH modulation symbols, and multiplexes PUCCH and PUSCH signals and the generated UL DMRS and SRS.

The radio transmission unit 2077 performs Inverse Fast Fourier Transform (IFFT) on the multiplexed signal, performs the modulation in compliance with an SC-FDMA scheme, appends the guard interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high-frequency signal (radio frequency), removes unnecessary frequency components, performs power amplification, and outputs a final result to the transmit and receive antenna 211 for transmission.

According to the first embodiment, the base station 1 transmits to the terminal 2 information for indicating a signal that is used in the received power measurement. Based on the information for indicating the signal that is used in the received power measurement and is transmitted from the base station 1, the terminal 2 measures the received power of the signal. To be more precise, in a case where the base station 1 gives an instruction to perform the received power measurement based on the first signal, the terminal 2 performs the received power measurement based on the first signal.

Furthermore, in a case where the base station 1 gives an instruction to perform the received power measurement based on the second signal, the terminal 2 performs the received power measurement based on the second signal.

Furthermore, in a case where the base station 1 gives an instruction to perform the received power measurement based on an n-th (n is a natural number) signal, the terminal 2 performs the received power measurement based on the n-th signal. Here, the first signal and the second signal may be individually set in terms of at least one among a transmission period, a measurement period, resource allocation, scrambling initiation ID, the number of antenna ports, and transmission power control. For example, the transmission period of the second signal may possibly be longer (be set to be longer) than that of the first signal.

Parameters may not be set for each of the first signal and the second signal, among the transmission period, the measurement period, the resource allocation, the scrambling initiation ID, transmission bandwidth, the number of antenna ports, and the transmission power control. For example, information relating to the measurement period or information relating to number of antenna ports may be set as the information relating to a configuration of the first signal, and information relating to the resource allocation, information relating to the transmission period, information relating to the number of antenna ports, or information relating to the scrambling initiation ID may be set to be in the second signal. Moreover, in some cases, the scrambling initiation ID is also referred to as a virtual cell ID or a virtual ID. The measurement period is a period with which a signal is received and is measured. Furthermore, in some cases, the measurement period is also referred to as a measurement subframe pattern (measSubframePattern).

Furthermore, the measurement subframe pattern may be indicated by a bit map. Furthermore, the measurement subframe pattern may be indicated by a period or a subframe offset.

The terminal 2 may not periodically perform the received power measurement. To be more precise, the terminal 2 may perform the received power measurement based on specific information.

The terminal 2 performs the received power measurement in the subframe that is indicated by the measurement subframe pattern. In a case where, in TDD, the subframe indicated by the measurement subframe pattern is an uplink subframe, the received power measurement may not be performed in the indicated subframe.

In a case where the subframe indicated by the measurement subframe pattern is a flexible subframe and is used as the uplink subframe, the terminal 2 may not perform the received power measurement with the indicated subframe.

Furthermore, that does not even need to be reflected as a result of the measurement. For example, the transmission period or the measurement period may be independently set for the first signal and the second signal.

Furthermore, the transmission period of the second signal may not be periodic. For example, the transmission period may be indicated by the bit map.

Furthermore, transmission of the second signal may be associated with a specific physical channel/physical signal.

Furthermore, the transmission of the second signal may be indicated by the downlink control information. Furthermore, the transmission of the second signal may be associated with specific information.

Furthermore, the resource allocation may be independently set for the first signal and the second signal.

Furthermore, the scrambling initiation ID may independently set for the first signal and the second signal. A sequence generation method may be set for the first signal and the second signal. Moreover, in some cases, the sequence is also referred to as a signal sequence, a reference signal sequence, or a channel sequence. For each of the first signal and the second signal, the sequence may be initialized with an independent scheme. To be more precise, $c_{init}$, a parameter that independently indicates an initial value of the sequence may be defined with the first signal and the second signal.

The parameter indicating the initial value of the sequence may be set based on a physical cell ID.

Furthermore, the parameter indicating the initial value of the sequence may be set based on the virtual cell ID.

Furthermore, the first signal and the second signal are the same in the resource allocation, but may be different in the transmission period from each other. For example, while the first signal is transmitted with every subframe, the second signal may be transmitted with a specific period. Information relating to the transmission period of the second signal at this time may be notified by a higher layer and may be set.

Furthermore, the first signal and the second signal may be different in the transmission bandwidth from each other. For example, the first signal is transmitted at all times with the resource being mapped onto an entire system bandwidth, but the second signal may be transmitted with the resource being mapped onto a specific transmission bandwidth. Information relating to the transmission bandwidth of the second signal at this time may be notified by a higher layer and may be set.

Furthermore, at this time, the signal sequences of the first signal and the second signal may be initialized with different cell IDs. For example, the signal sequence of the first signal may be initialized based on a physical cell ID or a virtual cell ID.

The signal sequence of the second signal may be initialized based on a virtual cell ID. Moreover, a third signal also may be handled in the same manner. To be more precise, various parameters may be independently set for the first to third signals. Moreover, an n-th signal (n is a natural number) also may be handled in the same manner. To be more precise, various parameters may be independently set to be in the information relating to the first to n-th signals.

Furthermore, various parameters that are set to be in pieces of information relating to configurations of the first to n-th signals may not be necessarily the same parameter. To be more precise, various parameters that are set to be in pieces of information relating to the configurations of the first to n-th signals may be independently set. These parameters may be set by the higher layer signaling (radio resource control signaling, dedicated signaling, or an RRC message).

Furthermore, these parameters may be set using the PDCCH. That is, these parameters may be set using the higher layer signaling and/or the PDCCH. Furthermore, the physical cell ID is a parameter that is set to be specific to a cell, and the virtual cell ID is a parameter that is set to be specific to a terminal. To be more precise, the terminals 2 within the cell share the same value of the physical cell ID, but the virtual cell ID is independently set to be in the terminals 2. For example, the terminal 2 may detect the physical cell ID using the synchronization signal(s). Furthermore, the terminal 2 may acquire the virtual cell ID based on information that is transmitted using a higher layer signal and/or the PDCCH.

The first to n-th signals may be transmitted with independent antenna ports, respectively. In the first to n-th signals, in a case where multiple antenna ports are set, the antenna ports in accordance with the number of antenna ports may be set.

Among the first to n-th signals, in the signal for which the multiple antenna ports are set, the resources may be allocated in such a manner that the resources do not overlap between the antenna ports. Furthermore, among the first to n-th signals, in the signal for which the multiple antenna ports are set, the antenna ports may be different in weighting from one another. Among the first to n-th signals, in the signals for which the multiple antenna ports are set, control may be performed in such a manner that the antenna ports are different in cyclic shift from one another.

The pseudo-random sequences for the first to n-th signals may be generated based on the physical cell ID (PCI: Physical layer Cell Identity, Physical Cell Identifier).

Furthermore, the pseudo-random sequences for the first to n-th signals may be generated based on the virtual cell identify (VCID).

Furthermore, the pseudo-random sequences for the first to n-th signals may be generated based on the scrambling initiation ID (Identity). In each signal, in a case where the virtual cell ID or the scrambling initiation ID is not set (for example, in a case where an effective virtual cell ID or scrambling initiation ID is not set by a higher layer), the pseudo-random sequence may be generated based on the physical cell ID.

Methods of generating the pseudo-random sequences for the first to n-th signals may be individually defined.

Furthermore, initialization of each of the pseudo-random sequences for the first to n-th signals may be defined in an independent way. To be more precise, each of the pseudo-random sequences for the first to n-th signals may be initialized in an independent way.

Furthermore, a base sequence may be generated based on the pseudo-random sequence.

Furthermore, a signal sequence may be generated based on the pseudo-random sequence.

Furthermore, the signal sequence may be generated based on the base sequence.

Furthermore, the pseudo-random sequence may be used as a scrambling sequence.

Furthermore, the signal sequence may be generated based on the Zadoff-Chu sequence.

Furthermore, the signal sequence may be generated based on a Gold sequence.

By allocating an independent signal sequence to each of the first signal and the second signal, the terminal 2 can improve detection accuracy of each of the first signal and the second signal.

By allocating an independent signal sequence to each of the first signal and the second signal, the terminal 2 can determine whether or not a signal is transmitted from the cell in which the terminal 2 itself is registered.

Furthermore, in a case where the first signal and the second signal are the same in the resource allocation, the terminal 2 can detect the first signal and/or second signal by a difference in the signal sequence between the first signal and the second signal. To be more precise, the terminal 2 can identify each signal by the difference in the signal sequence.

Furthermore, a frequency shift may be applied to the resource allocation (mapping to resource elements or mapping to physical resources) to each of the first to n-th signals. Furthermore, the frequency shift may be set based on the physical cell ID. Furthermore, the frequency shift may be set based on the virtual cell ID.

Information relating to the resource allocation to each of the first to n-th signals may be notified by the higher layer signaling. In some cases, the information relating to the resource allocation is also referred to as information relating to a configuration of the radio resource.

Pieces of information relating to the configurations of the first to n-th signals may be notified by the higher layer signaling from the base station 1 to the terminal 2. Furthermore, among the pieces of information relating to the configurations of the first to n-th signals, pieces of information relating to multiple settings with respect to one terminal 2 may be set to be in any one of the signals.

The first to n-th signals may be referred to as first to n-th reference signals, respectively.

Furthermore, among the first to n-th signals, at least one signal may be used in the demodulation of a physical broadcast channel.

Furthermore, among the first to n-th signals, at least one signal may be used in the demodulation of the physical downlink control channel.

Furthermore, among the first to n-th signals, at least one signal may be used in the demodulation of the physical downlink shared channel.

Furthermore, among the first to n-th signals, at least one signal may be used in the demodulation of a physical multicast channel (PMCH).

Furthermore, among the first to n-th signals, at least one signal may be used in time/frequency synchronization detection.

Furthermore, among the first to n-th signals, at least one signal may be used in the channel estimation. To be more precise, at least one signal may be used in the feedback on the channel state information (CSI).

Furthermore, among the first to n-th signals, at least one signal may be used in the received quality measurement.

Furthermore, among the first to n-th signals, at least one signal may be used in the received power measurement.

Furthermore, among the first to n-th signals, at least one signal may be used in mobility management.

Furthermore, among the first to n-th signals, at least one signal may be used in resource management.

Furthermore, among the first to n-th signals, at least one signal may be used in positioning detection.

The first to n-th signals may be different in the number of resource elements that are arranged within one physical resource block (PRB) or one pair of PRBs. For example, within one subframe (or one slot), the number of resource elements that are used in the transmission of the second signal may possibly be (be set to be greater) greater than the number of resource elements that are used in the transmission of the first signal.

Moreover, in a case where the base station 1 instructs the terminal 2 to measure the received power based on the second signal, the terminal 2 may calculate a downlink path loss based on the result of the measurement, and may use the calculated downlink path loss in control of uplink transmission power.

Here, in some cases, the received power measurement is also referred to as reference signal received power (RSRP) measurement or received signal power measurement. Furthermore, in some cases, the received quality measurement is also referred to as reference signal received quality (RSRQ) measurement or received signal quality measurement.

Furthermore, the resource allocation (mapping to resource elements or mapping to physical resources) to the second signal may be frequency-shifted. The frequency shift of the second signal may be determined based on the physical cell ID. Furthermore, the frequency shift of the second signal may be determined based on the virtual cell ID.

As one example, the base station 1 notifies the terminal 2 of information indicating whether or not the received power measurement of the second signal is performed. In a case where the instruction information indicates that the received power measurement of the second signal can be performed, the terminal 2 performs the received power measurement of the second signal. At this time, the terminal 2 may perform the received power measurement of the first signal in parallel with the second signal. In a case where the instruction information indicates that the received power measurement cannot be performed, the terminal 2 performs only the received power measurement of the first signal. Moreover, information indicating whether or not the received quality measurement of the second signal is performed may be included in the instruction information. Furthermore, the received power measurement of the third signal may be performed without the instruction information.

Furthermore, as another example, the base station 1 notifies the terminal 2 of the information indicating whether or not the received power measurement of the first signal or the received power measurement of the second signal is performed. In a case where the instruction information indicates that the received power measurement of the first signal is performed, the terminal 2 performs the received power measurement of the first signal. In a case where the instruction information indicates that the received power measurement of the second signal is performed, the terminal 2 performs the received power measurement of the second signal. To be more precise, the instruction information is information indicating switching of the received power measurement. Furthermore, the information indicating whether or not the received quality measurement is performed may be included in the instruction information. Furthermore, the received power measurement of the third signal may be performed without the instruction information.

Figure 3:
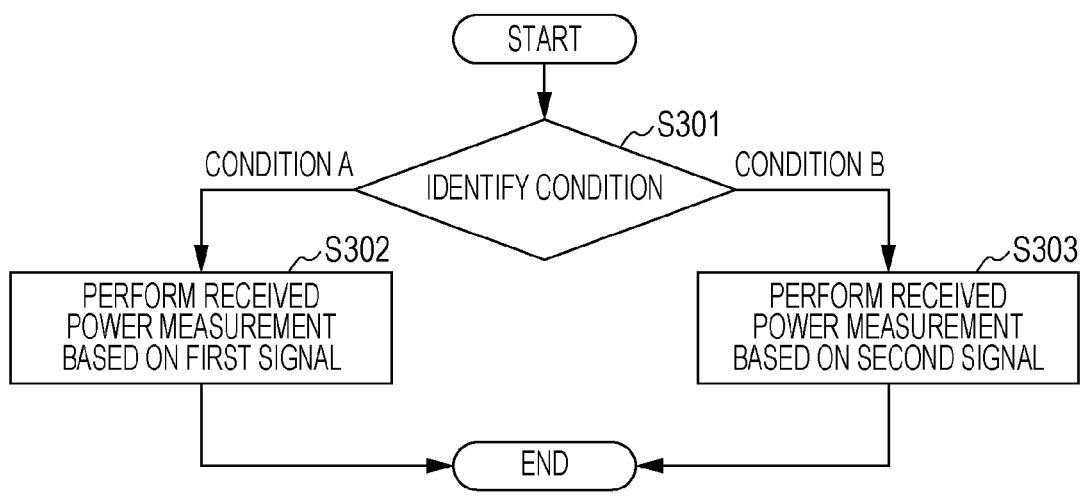
FIG. 3 is a schematic block diagram illustrating a procedure for measuring received power of the terminal 2 according to each embodiment of the present invention.

As illustrated in FIG. 3, the terminal 2 identifies a condition, and performs the received power measurement based on the condition. The terminal 2 identifies the condition (Step S301). In the case of condition A (S301: condition A), the terminal 2 performs the received power measurement based on the first signal (Step S302). Furthermore, in the case of condition B (S301: condition B), the terminal 2 performs the received power measurement based on the second signal (Step S303). Furthermore, in the case of the condition B, the terminal 2 may perform the received power measurement based on the first signal. Furthermore, in the case of the condition B, the terminal 2 may perform the received power measurement based on an n-th signal.

Here, referring to FIG. 3, according to the first embodiment, the instruction information that does not indicate that the received power measurement is performed based on the second signal is described as being included in the condition A. Furthermore, the instruction information indicating that the received power measurement is performed based on the second signal is included in the condition B. At this time, in a case where information relating to a configuration of the third signal is set to be in the terminal 2, the terminal 2 may perform the received power measurement based on the third signal regardless of the condition A or the condition B.

With the instruction information that is notified from the base station 1, it can be determined whether the received power of the first signal or the received power of the second signal is measured. Moreover, in a case where the base station 1 does not transmit the first signal, because the terminal 2 perform control in such a manner that the first signal is not monitored, power consumption can be correspondingly suppressed.

(Second Embodiment)

Next, a second embodiment of the present invention is described. According to the second embodiment, the base station 1 transmits to the terminal 2 information relating to a configuration of at least one signal among the information relating to the configuration of the first signal and the information relating to the configuration of the second signal. In a case where the information relating to the configuration of at least one signal is detected among the information relating to the configuration of the first signal and the information relating to the configuration of the second signal, the terminal 2 performs the received power measurement on the detected signal. The first signal and the second signal are different from each other in terms of the condition for performing the received power measurement. For example, the received power of the first signal may be measured regardless of the presence or absence of the configuration of the first signal. To be more precise, the terminal 2 may possibly measure the received power of the first signal by default. To be more precise, the first signal is defined as a signal that is determined in a manner that is particular to a system, and the terminal 2 may perform the received power measurement based on this signal.

Furthermore, the received power of the second signal may possibly be measured only in a case where the information relating to the configuration of the second signal is set to be in the terminal 2.

Furthermore, if the pieces of information relating to the configurations of multiple second signals are not set to be in the terminal 2, the received power of the second signals may not be measured. To be more precise, in a case where one piece of configuration information relating to the configuration of the second signal is present, the received power of the second signal may not be measured.

Furthermore, in a case where only one piece of information relating to the configuration of the second signal is set to be in the terminal 2, the terminal 2 may perform the channel estimation based on the second signal.

Furthermore, in a case where the information relating to the configuration of the second signal is set to be in the terminal 2, the received power measurement may be performed on the second signal instead of on the first signal.

Furthermore, the information relating to the configuration of the first signal may be determined in a manner that is particular to the system. The information relating to the configuration of the first signal may be notified as the broadcast information or the system information. The information relating to the configuration of the first signal may be individually notified from the base station 1 to the terminal 2.

Furthermore, the information relating to the configuration of the second signal may be notified with the broadcast information or the system information. The information relating to the configuration of the second signal may be individually notified from the base station 1 to the terminal 2.

Information indicating the transmission bandwidth may be included in the information relating to the configuration of the second signal.

Furthermore, information indicating the virtual cell ID (scrambling initiation ID) for generating the signal sequence for the second signal may be included in the information relating to the configuration of the second signal.

Furthermore, information indicating the transmission period and the subframe offset may be included in the information relating to the configuration of the second signal.

Furthermore, information indicating the resource allocation may be included in the information relating to the configuration of the second signal.

Furthermore, information indicating the number of antenna ports may be included in information relating to the configuration of the second signal.

Furthermore, information for determining the transmission power of the second signal may be included in the information relating to the configuration of the second signal. For example, the information for determining the transmission power of the second signal may be a power offset.

Furthermore, the information for determining the transmission power of the second signal may be a transmission power value of the second signal.

Furthermore, for the second signal, the frequency shift may be determined with a value that is set to be in the virtual cell ID.

Furthermore, for the second signal, the frequency shift may be determined with a value that is set to be in the physical cell ID.

Furthermore, the resource allocation to the second signal may be arranged in such a manner as to avoid the resource allocation to the first signal. That is, the first signal may be arranged in the resource that is not used among the resources (possibly the resource element) that are to be used for the transmission of the second signal.

Furthermore, the second signal may be arranged in the resource that is not used among the resources that are to be used for the transmission of the first signal.

Furthermore, the resource allocation to the second signal may overlap the resource allocation to the first signal.

Furthermore, the resource allocation to the second signal may overlap the resource allocation to the demodulation reference signal.

The resource allocation to the second signal may overlap the resource allocation to the channel state information reference signal.

Furthermore, the resource allocation to the second signal may overlap the resource allocation to the cell-specific reference signal.

Furthermore, the resource allocation to the second signal may overlap the resource allocation to a positioning reference signal (P-RS).

Furthermore, the second signal may be a signal for the received power measurement.

Furthermore, the second signal may be a signal for the channel estimation. To be more precise, various parameters for setting the second signal may be set to be in the information relating to the configuration of the second signal.

Furthermore, in a case where the information relating to the configuration of the second signal is linked to specific information, the received power measurement may be performed based on the second signal. For example, in a case where the information relating to the configuration of the second signal is linked to information relating to the measurement object configuration, the received power measurement may be performed based on the second signal.

Furthermore, in a case where the pieces of information relating to the configurations of multiple second signals are set to be in the terminal 2, if among the pieces of information relating to the configurations, pieces of information relating to the virtual cell IDs are set to be different from one another, the received power measurement is performed individually and independently. If, among the pieces of information relating to the configurations, pieces of information relating to the virtual cell IDs are the same value, the received power measurement may be performed for the shared signal. This may be applied to an n-th signal (n is a natural number).

For example, in a case where the resource allocation to the first signal and the resource allocation to the second signal overlap each other, for each of the first signal and the second signal, the signal sequence may be initialized in an independent scheme (method). Furthermore, in a case where the radio resource allocated to the first signal and the radio resource allocated to the second signal overlap each other, for each of the first signal and the second signal, the signal sequence may be initialized in an independent way. Furthermore, for the second signal, the signal sequence may be initialized with the virtual cell ID. To be more precise, the signal sequence for the first signal may be generated based on the physical cell ID or the virtual cell ID. The signal sequence for the second signal may be generated based on the virtual cell ID.

Furthermore, in the case where the resource allocation to the first signal and the resource allocation to the second signal overlap each other, a value of the cell ID (the physical cell ID or the virtual cell ID) that is used in the signal sequence for each signal may be applied to the frequency shift.

Furthermore, in the case where the resource allocation to the first signal and the resource allocation to the second signal overlap each other, the signals may be transmitted from different antenna ports, respectively. To be more precise, for the first signal and the second signal, the signal sequence may possibly be independently generated by a difference between the antenna ports.

Here, referring to FIG. 3, according to the second embodiment, the condition A may include a condition that the terminal 2 is not configured with the information relating to the configuration of the second signal. That is, the condition A may include a condition that the terminal 2 is configured with only the information relating to the configuration of the first signal. The condition B may include a condition that the terminal 2 is configured with the information relating to the configuration of the second signal.

The terminal 2 can determine whether or not the received power of the second signal can be measured, according to whether or not the information relating to the configuration of the second signal is configured. To be more precise, because the information indicating whether or not the second signal is measured for the terminal 2 is unnecessary, the base station 1 does not need to additionally transmit to the terminal 2 an amount of information indicating whether or not the second signal is measured.

(Third Embodiment)

Next, a third embodiment is described. According to the third embodiment, the base station 1 transmits to the terminal 2 information relating to a carrier type (component carrier corresponding to a cell) with respect to a certain cell. In a case where a first carrier type is indicated (set) with the information relating to the carrier type, the terminal 2 measures the received power for the cell on the basis of the first signal. In a case where a second carrier type is indicated with the information relating to the carrier type, the terminal 2 measures the received power for the cell on the basis of the second signal. At this time, the base station 1 transmits the information relating to the configuration of the second signal to the terminal 2. Furthermore, the base station 1 transmits the information relating to a measurement report event with respect to the second signal to the terminal 2. When the second carrier type is set for a certain cell, with a higher layer, the measurement report event with respect to the second signal is set for the terminal 2. Furthermore, when the second carrier type is set for a certain cell, the terminal 2 measures the received power (RSRP) based on the second signal. Furthermore, when the second carrier type is set for a certain cell, the terminal 2 performs a measurement report based on the measurement report event with the second signal. Here, in some cases, the carrier type is also referred to as a cell type.

Furthermore, the carrier type may indicate a type (a kind or a format) of component carrier corresponding to the cell.

Furthermore, the first carrier type may be set for the component carrier corresponding to the primary cell.

Furthermore, the first carrier type may be set for the component carrier corresponding to the secondary cell.

Furthermore, the first carrier type may be set for the component carrier corresponding to the serving cell.

Furthermore, the second carrier type may have a different definition from the first carrier type.

Furthermore, the first carrier type or the second carrier type may possibly be set for the serving cell.

Furthermore, the first carrier type or the second carrier type may possibly be set for the primary cell.

Furthermore, the first carrier type or the second carrier type may possibly be set for the secondary cell.

Furthermore, in the cell for which the second carrier type is set, in some cases, a part of the physical channels may be not transmitted that is transmitted in the cell for which the first carrier type is set. In the cell for which the second carrier type is set, the base station 1 may not transmit the cell-specific reference signal.

Furthermore, in the cell for which the second carrier type is set, the base station 1 may not transmit the primary synchronization signal and the secondary synchronization signal. To be more precise, in the cell for which the first carrier type is set and in the cell for which the second carrier type is set, the same type of signal or the same type of physical channel may not necessarily be transmitted.

Furthermore, in the cell for which the second carrier type is set, the base station 1 may not transmit the physical downlink control channel.

Furthermore, in the cell for which the second carrier type is set, the terminal 2 may not detect the signal or the physical channel that is scheduled with the physical cell ID.

In the cell for which the second carrier type is set, the time/frequency synchronization may be performed with the second signal. In the cell for which the second carrier type is set, cell detection may be performed with the second signal.

Furthermore, the second carrier type may be applied to a specific type of cell. For example, the second carrier type may be applied to a small cell or a femto cell and a phantom cell. The second carrier type may be applied to only a specific terminal 2. That is, the first carrier type and the second carrier type may be identified based on the configuration by the base station 1. The base station 1 may transmit the configuration with respect to the physical channel/signal described above, as a configuration corresponding to the first carrier type.

Furthermore, the base station 1 may not transmit the configuration with respect to the physical channel/physical signal described above, as a configuration corresponding to the second carrier type. That is, the base station 1 may indicate the second carrier type by not transmitting the configuration corresponding to the first carrier type.

The base station 1 may broadcasts information relating to the second carrier type. Furthermore, the base station 1 may broadcast the information relating to the second carrier type to the entire cell in a state of being included in the system information. The information relating to the second carrier type may possibly be detected by only some terminals. Furthermore, by the higher layer signaling, the base station 1 may transmit the information relating to the second carrier type to each individual terminal. Furthermore, the information relating to the second carrier type may be associated with specific information. To be more precise, even though the information relating to the second carrier type is not detected, if only specific information is detected, the terminal 2 may recognize the second carrier type as being set.

In the cell for which the second carrier type is set, in a case where the configuration of the second signal is not set, the terminal 2 may measure the received power based on the first signal. Furthermore, in a case where the configuration of the second signal is set, the terminal 2 may measure the received power based on the second signal. At this time, the terminal 2 may not measure the received power based on the first signal.

Furthermore, the terminal 2 may set the path loss based on the received power obtained from the second signal. Moreover, the terminal 2 may set the transmission power of the uplink signal from the path loss.

Furthermore, with regard to the third signal, the terminal 2 may perform the received power measurement with respect to the cell regardless of the carrier type.

In the communication system in which a handover to a cell for which the second carrier type is set is possible, in a case where an instruction to perform the handover to the cell for which the second carrier type is set is given, the terminal 2 may perform the received power measurement based on the second signal. Furthermore, in the communication system, a procedure for the handover to the cell for which the second carrier type is set may be performed.

In the communication system in which the handover to the cell for which the second carrier type is set is possible, in a case where the terminal goes through (detects, experiences, or recognizes) a radio link failure (RLF) in the cell, the terminal may perform a reestablishment procedure. Furthermore, in the communication system in which the cell that is set to the second carrier type functions in a stand-alone manner, in the case where the terminal goes through (detects, experiences, or recognizes) the radio link failure (RLF) in the cell, the terminal may perform the reestablishment procedure. Furthermore, at this time, the terminal 2 may perform the reestablishment procedure on the cell that is not set to the second carrier type. Furthermore, in the communication system in which the cell that is set to the second carrier type functions in a stand-alone manner, in the case where the terminal goes through (detects, experiences, or recognizes) the radio link failure (RLF) in the cell, the terminal may perform the reestablishment procedure. Moreover, in most cases, the reestablishment is also referred to as an RRC connection reestablishment.

Furthermore, in the communication system in which the cell that is set to the second carrier type functions in a stand-alone manner, in a case where information relating to the second carrier type is broadcast in a state of being set to be in the system information, the terminal 2 may perform synchronization detection based on the second signal. Furthermore, at this time, the terminal 2 may perform the received power measurement based on the second signal. Furthermore, in a case where the information relating to the second carrier type is not set to be in the system information, the terminal 2 may perform the synchronization detection based on the primary synchronization signal or the secondary synchronization signal. Furthermore, the terminal 2 may perform the received power measurement based on the first signal.

Furthermore, in the communication system in which the cell that is set to the second carrier type functions in a stand-alone manner, in a case where the information relating to the second carrier type is broadcast in a state of being included in the system information, with random access, the terminal 2 may perform an initial connection to the cell. To be more precise, the terminal 2 may perform the random access to the cell for which the second carrier type is set. Furthermore, the terminal 2 may detect a random access problem in the cell. When the random access problem is detected, the terminal 2 may notify a higher layer of the random access problem, and the higher layer that is notified of the random access problem may determine that radio link failure occurs. At that time, the reestablishment procedure may be triggered.

Furthermore, in the communication system in which the cell that is set to the second carrier type functions in a stand-alone manner, the terminal 2 may transmit a control channel corresponding to the physical uplink control channel to the base station 1. However, the resource allocation to the control channel may not be arranged in the same manner as with the physical uplink control channel.

Furthermore, in a case where, by a higher layer, an instruction to perform the reestablishment with respect to the cell that is set to the second carrier type is given by the base station 1, the terminal 2 may perform the received power measurement based on the second signal. Furthermore, in a case where, by a higher layer, an instruction to perform the reestablishment with respect to the cell that is set to the second carrier type is not given by the base station 1, the received power measurement may be performed based on the first signal.

In a case where the information relating to the configuration of the second signal is included in the received RRC message, the terminal 2 may perform the received power measurement based on the second signal. The RRC message may be a message that is used to perform the handover. Furthermore, the RRC message may be a message that is used to indicate a cell addition/removal. Furthermore, the RRC message may be a message indicating measurement. The RRC message is notified with dedicated signaling.

One example of operation of each of the base station 1 and the terminal 2 will be described below. For example, in the cell (for example, a macro cell) for which the first carrier type is set, the terminal 2 performs the received power measurement based on at least the first signal. Here, the first signal is generated (or mapped) based on the physical cell ID (for example, a value of the physical cell ID with respect to the cell for which the first carrier type is set). Furthermore, the first signal is generated (or mapped) based on the virtual cell ID (for example, a value of the virtual cell ID with respect to the cell for which the first carrier type is set) that is set using a higher layer signal (for example, a dedicated signal).

Here, the base station 1 transmits a parameter relating to the second signal to the terminal 2 in a state of being included in the higher layer signal (for example, the dedicated signal). Here, any one of information indicating a transmission period of the second signal, information indicating a transmission bandwidth of the second signal, information indicating whether or not to perform the detection of the second signal, and a virtual cell ID (for example, a value of a virtual cell ID with respect to a cell 1 (for example, a small cell 1) for which the second carrier type is set) may be included in a parameter relating to the second signal.

Furthermore, a parameter relating to the measurement of the received power that is based on the second signal may be transmitted as a parameter relating to the second signal. Here, a parameter for indicating whether or not the received power is measured based on the second signal may be included in the parameter relating to the measurement of the received power that is based on the second signal. Moreover, in some cases, the parameter relating to the second signal is also referred to as the information relating to the configuration of the second signal.

The terminal 2 that receives the parameter relating to the second signal from the base station 1 detects the second signal. Here, the terminal 2 may transmit to the base station 1 information indicating that the second signal is detected (e.g. information indicating that the detection of the second signal succeeds).

Furthermore, the base station 1 may transmit to the terminal 2 a parameter relating to the cell addition/removal (and/or a parameter relating to cell activation/deactivation) in a state of being included in a higher layer signal (for example, a dedicated signal). Here, the parameter (and/or the parameter relating to the cell activation/deactivation) relating to the addition/removal of the cell (for example, the cell 1 (small cell 1) for which the second carrier type is set) for which the second carrier type is set may be transmitted as the parameter relating to the cell addition/removal (and/or the parameter relating to the cell activation/deactivation). At this time, the base station 1 may set the parameter relating to the second signal in such a manner that the parameter relating to the second signal is associated with a cell being added. Furthermore, the base station 1 may set the parameter relating to the measurement of the received power that is based on the second signal in such a manner that the parameter relating to the measurement of the received power is associated with the cell being added.

Furthermore, in the cell 1 for which the second carrier type is set (for example, the small cell 1), the terminal 2 performs the received power measurement that is based on at least the second signal. Here, the second signal is generated (or mapped) based on the virtual cell ID (for example, the virtual cell ID with respect to the cell 1 (small cell 1) for which the second carrier type is set) that is set using a higher layer signal (for example, a dedicated signal).

Moreover, the base station 1 assigns the virtual cell ID (for example, a value of the virtual cell ID with respect to a cell 2 (small cell 2) for which the second carrier type is set) to the terminal 2 using a higher layer signal (for example, a dedicated signal). Here, the base station 1 may set the virtual cell ID using a higher layer signal and/or the PDCCH. Furthermore, the base station 1 may transmit the virtual cell ID in a state of being included in a message relating to the handover command. Furthermore, the base station 1 may transmit the parameter relating to the measurement of the received power measurement that is based on the second signal, in a state of being included in the higher layer signal (for example, the dedicated signal) or the message relating to the handover command. That is, switching (reconfiguration) from the cell (for example, the small cell 1) for which the second carrier type is set to the cell (for example, the small cell 2) for which the second carrier type is set is performed by re-setting the virtual cell ID without setting the parameter relating the cell addition/removal. Moreover, in some cases, the messages are also referred to as the RRC message.

Moreover, in the cell 2 (for example, the small cell 2) for which the second carrier type is set, the terminal 2 performs the received power measurement that is based on at least the second signal. Here, the second signal is generated (or mapped) based on the virtual cell ID (for example, the virtual cell ID with respect to the cell 2 (small cell 2) for which the second carrier type is set) that is set using a message relating to the higher layer signal (for example, the dedicated signal) or the handover command.

The operation of each of the base station 1 and the terminal 2 described above is only an example. That is, the present embodiment is not limited to the operation as described above, and all the same operations are included in the present embodiment.

In a case where pieces of information relating to configurations of CSI-RSs in which the virtual cell IDs are set to the same value are set to be in a shared measurement ID (or a measurement object ID), the received power measurement may be performed using these multiple CSI-RSs.

In a case where the values of the virtual cell IDs that are set to be in the pieces of information relating to the configurations of multiple CSI-RSs are set to the same value, the received power measurement may be performed using these multiple CSI-RSs. In a case where the virtual cell IDs are set to different values, respectively, the received power measurement may be performed using these multiple CSI-RSs independently.

In a case where the cell that is set to the second carrier type is deactivated, based on a first measurement period, the terminal 2 performs the received power measurement that is based on the second signal. Furthermore, in a case where the cell that is set to the second carrier type is activated, based on a second measurement period, the terminal 2 performs the received power measurement that is based on the second signal. For example, being deactivated means that data communication is not performed between the base station and the terminal.

Figure 4:
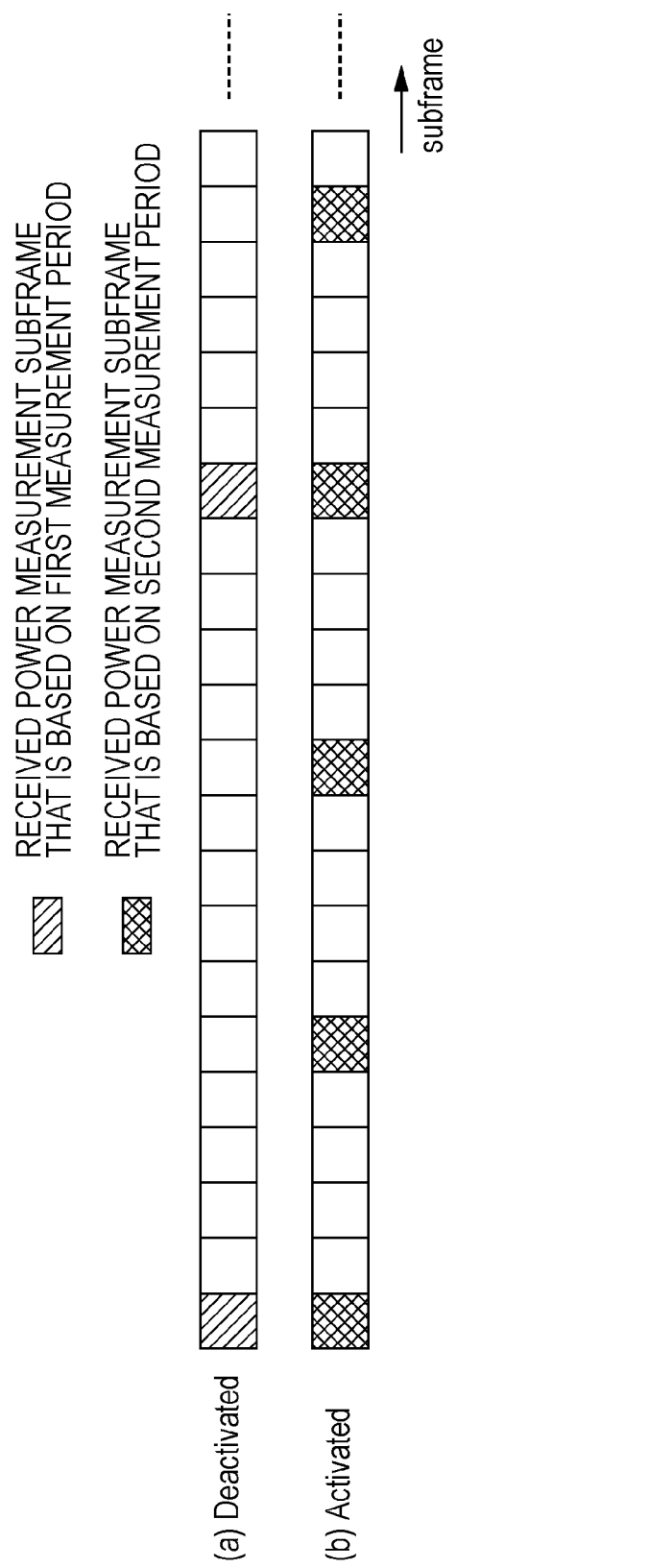
FIG. 4 is a schematic block diagram illustrating a received power measurement subframe of the terminal 2 according to a third embodiment of the present invention.

As illustrated in FIG. 4, the terminal 2 can set a received power measurement subframe that is based on the first measurement period, and can set a received power measurement subframe that is based on the second measurement period. With the higher layer signaling, the base station 1 notifies these pieces of configuration information. To be more precise, according to whether the cell that is set to the second carrier type is deactivated or activated, the terminal 2 can switch the measurement period and switch the timing for performing the received power measurement. While reducing power consumption indispensable for the received power measurement by performing the received power measurement at long time intervals with respect to the cell that does not perform the data communication, the terminal 2 can perform suitable scheduling in a case where the data communication is performed to periodically report a result of the measurement to the base station 1.

Furthermore, in a case where, based on the first measurement period, the received power measurement that is based on the second signal is performed, when a predetermined measurement time configured from the first measurement period elapses, the terminal 2 reports to the higher layer the result of the measurement of the received power that is based on the second signal, and transmits such report information to the base station 1. Each terminal, in advance, reports to the base station 1 the information relating to the result of the measurement with respect to the deactivated cell (to be more precise, the cell that does not perform the data communication). Thus, the base station 1 can perform suitable scheduling when a cell switches from a deactivated state to an activated state.

Furthermore, in a case where, based on the second measurement period, the received power measurement that is based on the second signal is performed, when a predetermined condition (a measurement report event) that is included in the information relating to the result of the measurement is satisfied, the terminal 2 reports to the higher layer the result of the measurement of the received power that is based on the second signal, and transmits the report information to the base station 1. Furthermore, at this time, the terminal 2 may periodically report to the higher layer the result of the measurement of the received power that is based on the second signal, and may transmit the report information to the base station 1.

Here, referring to FIG. 3, according to the third embodiment, the instruction information that a predetermined carrier type is not set for a certain cell is described as being included in the condition A. Furthermore, the instruction information that the first carrier type is set for a certain cell is included in the condition A. Furthermore, the instruction information that a predetermined configuration (corresponding to the first carrier type) is transmitted to a certain cell is included in the condition A. The instruction information that a predetermined carrier type is set for a certain cell is included in the condition B. Furthermore, the instruction information that the second carrier type is set for a certain cell is included in the condition B. Furthermore, the instruction information that a predetermined configuration (corresponding to the second carrier type) is transmitted to a certain cell is included in the condition B. Furthermore, the instruction information that a predetermined configuration (corresponding to the first carrier type) is not transmitted to a certain cell is included in the condition B.

By setting specific information, receiving processing of a specific physical channel or physical signal is not performed. Thus, it is possible to suppress power consumption indispensable for the receiving processing.

Moreover, according to each of the embodiments described above, the terminal 2 may report to the base station 1 the result of the measurement of the received power that is based on the second signal. The terminal 2 may periodically make a report. Furthermore, in a case where a certain condition is satisfied, the terminal 2 may make a report.

According to each of the embodiments described above, in a case where the received power that is based on the second signal is measured, the terminal 2 may perform the transmission power control of the uplink signal based on the received power. Furthermore, the terminal 2 may determine the downlink path loss based on the received power.

Moreover, according to each of the embodiments, the resource element or the resource block is described above as being used as a unit for mapping information data signal, control information signal, the PDSCH, the PDCCH and a reference signal, and the subframe or the radio frame is described above as being used as a unit of transmission in a time domain, but the present invention is not limited to this. Even if, instead of these, domains and time units are used that are configured from an arbitrary frequency and time, respectively, the same effect can be obtained. Moreover, according to each of the embodiments described above, the case where the demodulation is performed using RS that is processed in a precoded manner is described, and for description, a port that is equivalent to an MIMO layer is used as a port corresponding to RS that is processed in a precoded manner, but the present invention is not limited to this. In addition, the same effect can be obtained by applying the present invention to ports that correspond to different reference signals, respectively. For example, unprecoded (non-precoded) can be used instead of precoded RS, and a port that is equivalent to an output terminal after the precoding processing, or a port that is equivalent to a physical antenna (or a combination of physical antennas) can be used.

Moreover, according to each of the embodiments described above, the uplink transmission power control is transmission power control of uplink physical channels (the PUSCH, the PUCCH, the PRACH, and the SRS), and the transmission power control includes switching and/or (re-) configuration of various parameters that are used in configurations of the transmission power of each of various uplink physical channels.

Moreover, according to each of the embodiments described above, the base station 1 may possibly set multiple virtual cell IDs for one terminal 2. For example, the base station 1 and a network including at least one base station 1 may possibly set the virtual cell ID independently for every physical channel/physical signal. Furthermore, multiple virtual cell IDs may possibly be set for one physical channel/physical signal. To be more precise, the virtual cell ID may possibly be set for every piece of information relating to the configuration of each physical channel/physical signal. Furthermore, with the multiple physical channels/physical signals, the virtual cell ID may be shared.

A program running on the base station 1 and the terminal 2 according to the present invention is a program (a program for causing a computer to operate) that controls a CPU and the like in such a manner as to realize the function according to the embodiment of the present invention. Then, the information that is handled in these apparatuses is temporarily stored in a RAM while being processed. Thereafter, the information is stored in various ROMs or HDDs, and whenever necessary, is read by the CPU to be modified or written. As a recording medium on which to store the program, among a semiconductor medium (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the embodiment described above is realized by running the loaded program, and in addition, the function according to the present invention is realized by performing processing in conjunction with an operating system or other application programs, based on an instruction from the program.

Furthermore, in a case where the programs are distributed on the market, the program stored on a portable recording medium can be distributed or the program can be transmitted to a server computer that connects through a network such as the Internet. In this case, a storage device in the server computer also is included in the present invention. Furthermore, some or all portions of the base station 1 and the terminal 2 according to the embodiment described above may be realized as an LSI that is a typical integrated circuit. Each functional block of the base station 1 and the terminal 2 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, an integrated circuit technology that substitutes for the LSI appears, it is also possible to use an integrated circuit to which such a technology is applied.

Moreover, the present invention is not limited to these embodiments described above. Furthermore, it does not go without saying that the terminal apparatus 1 according to the present invention is not to the application to the mobile station, but can be applied also to a fixed-type electronic apparatus that is installed indoors or outdoors, or a stationary-type electronic apparatus, for example, an AV apparatus, a kitchen apparatus, a cleaning or washing machine, an air-conditioning apparatus, an office apparatus, a vending machine, or other household apparatuses.

The embodiments of the invention are described in detail above referring to the drawings, but the specific configuration is not limited to the embodiments and includes an amendment to a design that falls within a scope not deviating from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for one that is mentioned according to each of the embodiments is also included in the technical scope of the present invention.

INDUSTRIAL APPLICABILITY

The present invention is suitable for use in a radio base station apparatus, a radio terminal apparatus, a radio communication system, or a radio communication method.

DESCRIPTION OF REFERENCE NUMERALS

1 BASE STATION
2 TERMINAL
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT AND RECEIVE ANTENNA UNIT
1011 RADIO RESOURCE CONTROL UNIT
1013 MEASUREMENT SETTING UNIT
1015 TRANSMISSION POWER SETTING UNIT
1051 DECODING UNIT
1053 DEMODULATION UNIT
1055 DEMULTIPLEXING UNIT
1057 RADIO RECEPTION UNIT
1071 CODING UNIT
1073 MODULATION UNIT
1075 MULTIPLEXING UNIT
1077 RADIO TRANSMISSION UNIT
1079 DOWNLINK REFERENCE SIGNAL GENERATION UNIT
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT AND RECEIVE ANTENNA
2011 RADIO RESOURCE CONTROL UNIT
2013 MEASUREMENT CONTROL UNIT
2015 TRANSMISSION POWER CONTROL UNIT
2051 DECODING UNIT
2053 DEMODULATION UNIT
2055 DEMULTIPLEXING UNIT
2057 RADIO RECEPTION UNIT
2071 CODING UNIT
2073 MODULATION UNIT
2075 MULTIPLEXING UNIT
2077 RADIO TRANSMISSION UNIT
2079 UPLINK REFERENCE SIGNAL GENERATION UNIT

The invention claimed is:

1. A terminal apparatus comprising:
a reception circuitry configured to perform, for a certain cell, a measurement of a first signal including a primary synchronization signal, a secondary synchronization signal and cell-specific signals in a first period in a case that the first period is configured,
wherein, in a case that a configuration of channel state information reference signals is configured as a part of a configuration of the first signal,
the reception circuitry is configured to perform, for the certain cell, that is set to a predetermined type being first type, a reference signal received power measurement based on the channel state information reference signals in the first duration, and
the reception circuitry is configured to perform, for the certain cell that is set to the predetermined type being second type, the reference signal received power measurement based on the channel state information reference signals in a second duration.

2. A base station apparatus comprising:
a transmission circuitry configured to transmit, for a certain cell, a first signal including a primary synchronization signal, a secondary synchronization signal and cell-specific reference signals in a first period in a case that information relating to a configuration of the first period is transmitted to a terminal apparatus,
wherein, in a case that a configuration of channel state information reference signals is configured as a part of a configuration of the first signal,
the transmission circuitry is configured to transmit, for the certain cell that is set to a predetermined type being first type, channel state information reference signals in a first duration, and
the transmission circuitry is configured to transmit, for the certain cell that is set to the predetermined type being second type, the channel state information reference signals in a second duration.

3. A method for a terminal apparatus, the method comprising:
performing, for a certain cell, a measurement of a first signal including a primary synchronization signal, a secondary synchronization signal and cell-specific signals in a first period in a case that the first period is configured,
wherein in a case that a configuration of channel state information reference signals is configured as a part of a configuration of the first signal,
performing, for the certain cell that is set to a predetermined type being first type, a reference signal received power measurement based on the channel state information reference signals in a first duration, and
performing, for the certain cell that is set to the predetermined type being second type, the reference signal received power measurement based on the channel state information reference signals in a second duration.

* * * * *